(12) United States Patent
Colton

(10) Patent No.: US 12,484,169 B2
(45) Date of Patent: Nov. 25, 2025

(54) DYNAMIC CLIENT FIBER TROUGH AND HINGE ASSEMBLIES FOR A RACK OR CABINET SYSTEM

(71) Applicant: Ciena Corporation, Hanover, MD (US)

(72) Inventor: Fabien Colton, Kars (CA)

(73) Assignee: Ciena Corporation, Hanover, MD (US)

( * ) Notice: Subject to any disclaimer, the term of this patent is extended or adjusted under 35 U.S.C. 154(b) by 106 days.

(21) Appl. No.: 18/522,558

(22) Filed: Nov. 29, 2023

(65) Prior Publication Data
US 2025/0176120 A1    May 29, 2025

(51) Int. Cl.
*H05K 5/02*  (2006.01)
*G02B 6/44*  (2006.01)

(52) U.S. Cl.
CPC ......... *H05K 5/0226* (2013.01); *H05K 5/0247* (2013.01); *G02B 6/444* (2013.01)

(58) Field of Classification Search
CPC ...... G02B 6/444; G02B 6/441; G02B 6/4452; G02B 6/44524; G02B 6/44526; G02B 6/4453; G02B 6/4454; G02B 6/4455; G02B 6/4459; G02B 6/446; G02B 6/4461; G02B 6/4472; H04Q 1/021; H04Q 1/023; H04Q 1/025; H04Q 1/026; H04Q 1/06; H04Q 1/062; H04Q 1/066; H04Q 1/068; H04Q 1/12; H04Q 1/131; H04Q 1/133; H05K 5/0226; H05K 5/0247
USPC ...................................................... 312/223.1
See application file for complete search history.

(56) References Cited

U.S. PATENT DOCUMENTS

| | | | |
|---|---|---|---|
| 5,179,618 A | 1/1993 | Anton | |
| 6,613,981 B1 | 9/2003 | Hathcock et al. | |
| 6,742,746 B1 * | 6/2004 | La Scola | G02B 6/4459 248/68.1 |
| 7,510,421 B2 * | 3/2009 | Fransen | H04Q 1/021 439/449 |
| 8,229,265 B2 * | 7/2012 | Solheid | G02B 6/483 385/139 |
| 8,730,678 B1 * | 5/2014 | Cunningham | H05K 7/1491 174/72 A |
| 10,291,003 B2 * | 5/2019 | Marmonier | H02G 3/04 |
| 10,798,469 B2 * | 10/2020 | Mankinen | H04Q 1/142 |
| 11,815,727 B2 | 11/2023 | Wells et al. | |

(Continued)

OTHER PUBLICATIONS

Mar. 3, 2025 International Search Report issued in corresponding PCT Application PCT/US2024/056995.

*Primary Examiner* — Joshua E Rodden
(74) *Attorney, Agent, or Firm* — Clements Bernard Walker; Christopher L. Bernard

(57) ABSTRACT

A rack or cabinet system, including: a cabinet adapted to receive a circuit pack; a trough assembly movably coupled to the cabinet, where the trough assembly is adapted to receive a plurality of client fibers from a faceplate of the circuit pack; and a hinge assembly coupled to the cabinet and adapted to pivot the trough assembly away from/ towards a front portion of the cabinet and the circuit pack. The trough assembly and the hinge assembly are collectively adapted to pivot the trough assembly away from the front portion of the cabinet and the circuit pack to move the plurality of client fibers such that a plurality of fabric cables coupled to front-side portions of the circuit pack behind the plurality of client fibers can be accessed by a user.

20 Claims, 10 Drawing Sheets

(56) References Cited

U.S. PATENT DOCUMENTS

| | | | |
|---|---|---|---|
| 2004/0216911 A1* | 11/2004 | Franz | H02B 1/202 |
| | | | 174/72 A |
| 2006/0118321 A1* | 6/2006 | Herring | H02G 3/0431 |
| | | | 174/101 |
| 2008/0124039 A1* | 5/2008 | Gniadek | G02B 6/4453 |
| | | | 385/135 |
| 2011/0132855 A1* | 6/2011 | Papakos | H05K 7/18 |
| | | | 211/60.1 |
| 2015/0076976 A1* | 3/2015 | Bailey | H05K 7/1491 |
| | | | 312/223.1 |
| 2015/0103488 A1 | 4/2015 | Tanaka et al. | |
| 2018/0081133 A1 | 3/2018 | Franco Romo et al. | |
| 2023/0071067 A1* | 3/2023 | Kartadinata | H05K 5/0247 |

\* cited by examiner

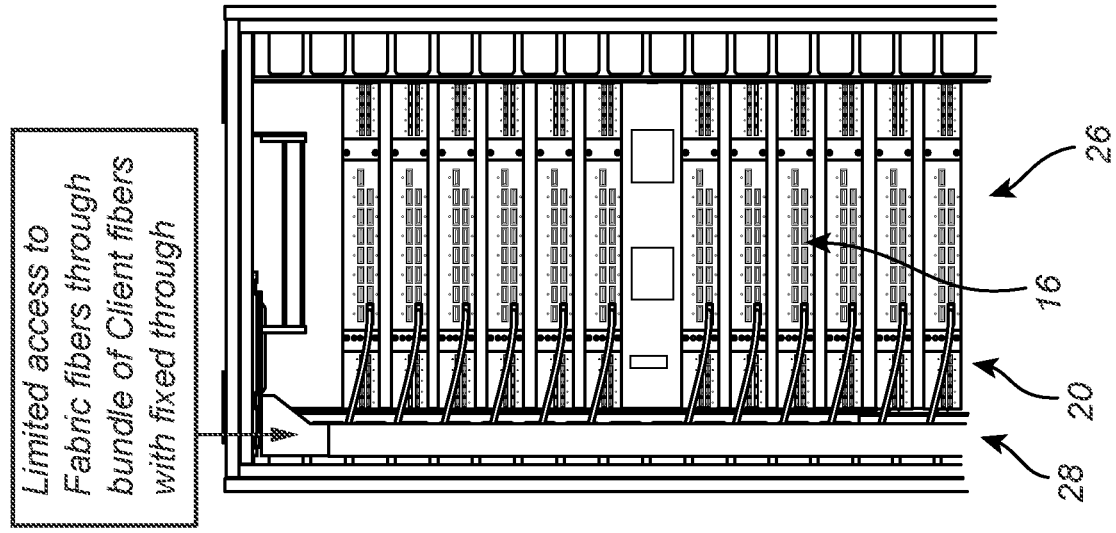
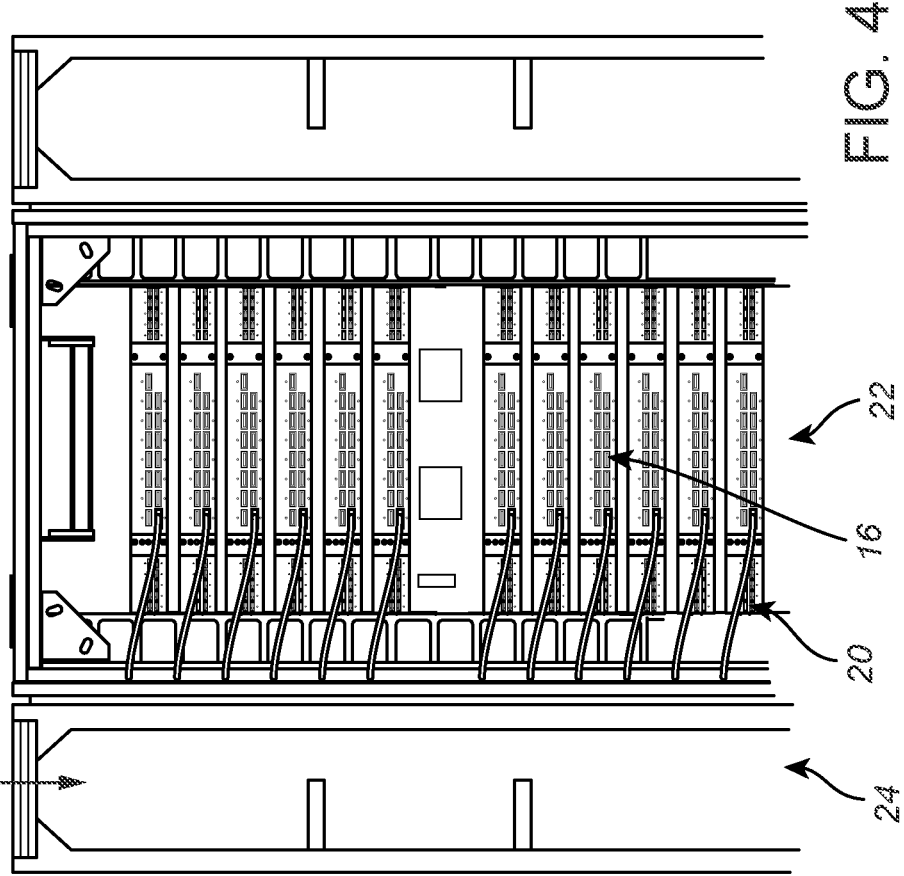
FIG. 4

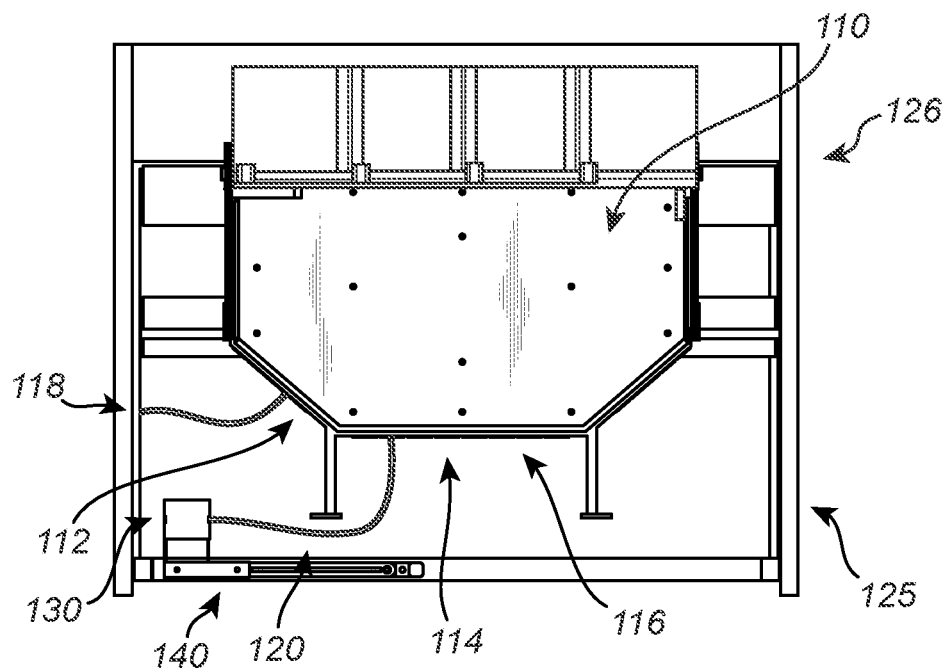
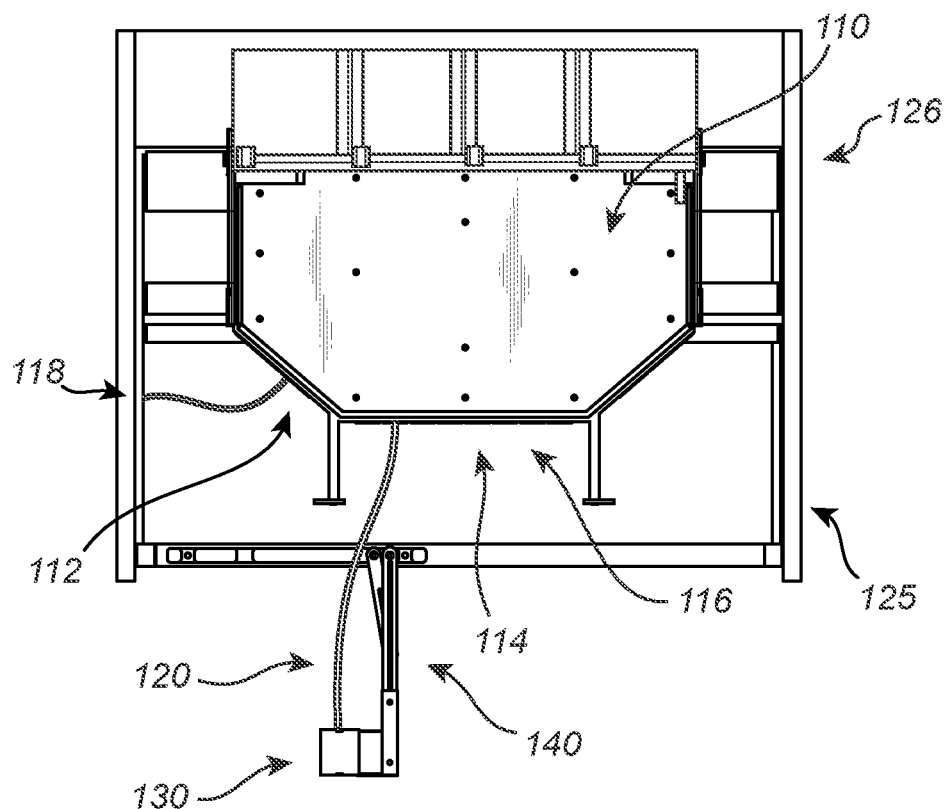
FIG. 5

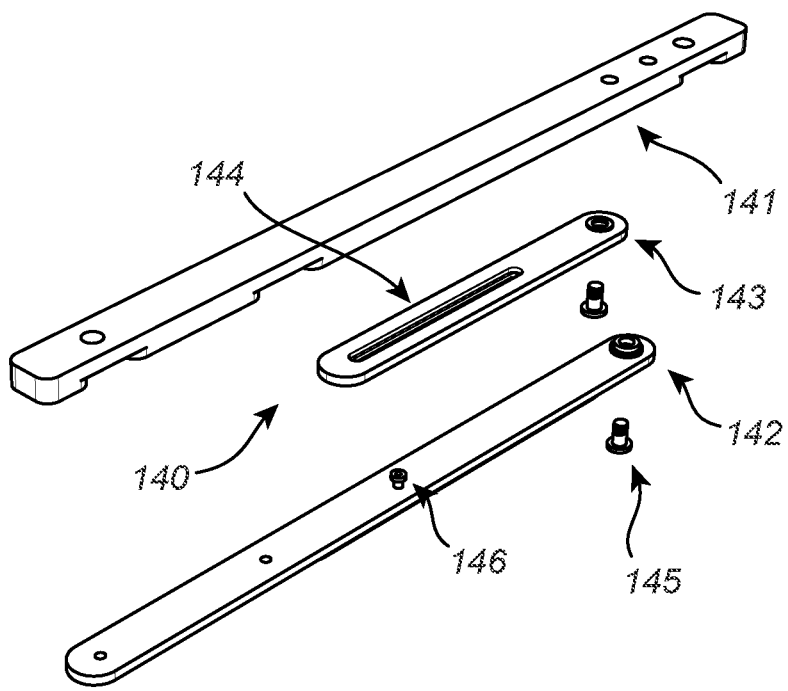
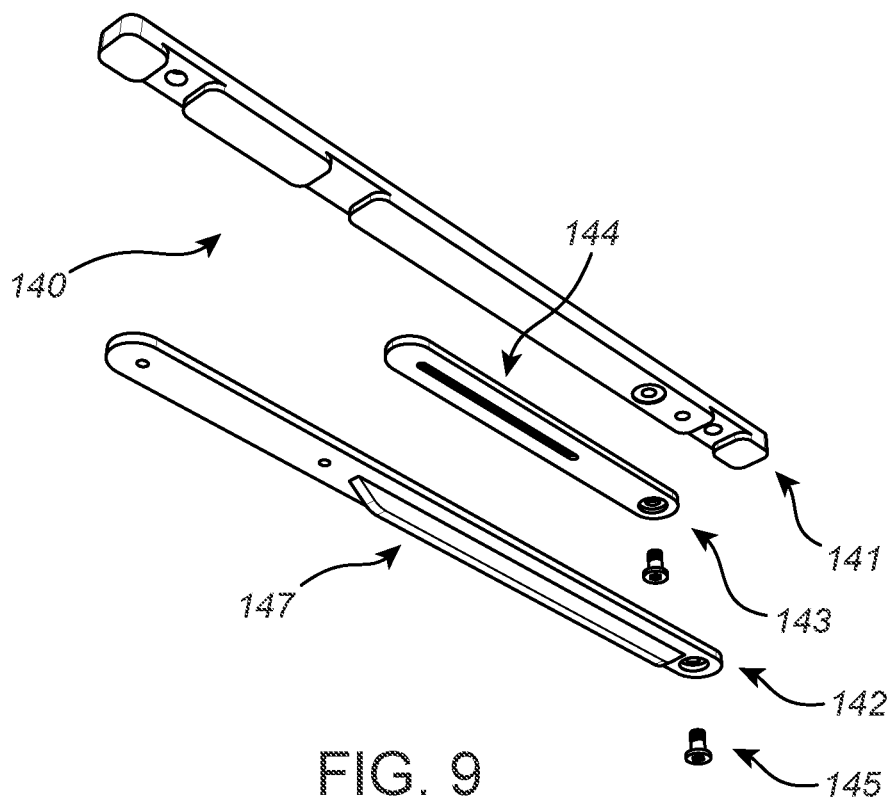
FIG. 9

DYNAMIC CLIENT FIBER TROUGH AND HINGE ASSEMBLIES FOR A RACK OR CABINET SYSTEM

TECHNICAL FIELD

The present disclosure relates generally to the telecommunications and optical networking fields. More particularly, the present disclosure relates to a dynamic client fiber trough assembly with an egress bend limiter and a hinge assembly for a rack or cabinet system.

BACKGROUND

Some rack systems (also referred to herein as cabinet systems) do not have a backplane providing a fabric data path between client and line/fabric cards (also referred to herein as circuit packs) like other rack systems, but rather rely on the use of externally-connected cables or fibers (such as, but not limited to, direct attach cables (DACs), active direct attach cables (AECs), and active optical cables (AOCs)) to make the fabric connections. For the shortest track length and best signal integrity, the fabric ports 12 are located on the left and right sides of the circuit packs 10, with the client ports 14 located in the center faceplate 16. This is generally illustrated in FIG. 1. As such, the cable management architecture is designed to locate the fabric cables 18 on either side of the rack system (within cable cabinets for easy access), and the client fibers 20 are routed to the fixed corner post of the rack or cabinet in the front of the rack or cabinet system. It should be noted that the rack/cabinet system ultimately receives the circuit packs 10 directly or with the circuit packs 10 being disposed in shelves, effectively making the rack/cabinet system a shelf system in the latter case. These terms may be used interchangeably herein, as may "rack" and "cabinet".

These rack/cabinet systems are often designed to be fully upgradable and expandable. Therefore, a user does not need to fill the rack/cabinet system with client cards on day one, but can add additional client cards as their demand grows. As the user adds additional client cards, additional fabric links must be added between these client cards and the fabric cards (with 20× cables for each card, for example).

FIG. 2 shows two zones in a wider seismic-rated rack or cabinet solution 22; the first area shows where the fabric cables 18 are routed and the second area shows where the client fibers 20 are routed. Cable cabinets 24 are included in the rack or cabinet solution 22 due to the large volume of fabric cables 18 in fully-populated 48T or 96T systems, for example. The cable cabinets 24 provide a dedicated area for copper cable slack management and allow access to the fabric cables 18 for service or user personnel. Even when 100% of the client fibers 20 are installed, hand access is available to the bundle of fabric cables 18 in the cable cabinets 24, without the risk of damaging the client fibers 20 as replacement/upgrades are performed.

Not only is access to the bundle of fabric cables important, but the routing method is a critical component to meet upgradability and expandability requirements. By way of example, a full 48T system contains 8× client boxes and 5× fabric boxes, which totals 80× 2.0 m fabric cables, 40× per side. A full 96T system contains 16× client boxes and 10× fabric boxes, which totals 160×2.0 m fabric cables, 80× per side. It is expected that a user wants to use the lowest cost solution for fabric, for intra-bay cabling, which is DAC— these cables cost less, but are stiffer and have a larger diameter (and, therefore, larger overall cable bulk) than the more expensive fabric alternative, AOC. As mentioned, the wider cabinet solution allows for system upgrade from sub-48T to 48T, and expansion of a 48T system (i.e., one shelf) to a 96T system (i.e., two shelves) within one rack. These upgrades require significant cable addition and/or reconfiguration, which necessitates access to the fabric area. This cable access is designed into the wider cabinet solution (via the front of the cable cabinet).

However, some users require a more compact rack or cabinet solution, since some user sites have floor space constraints, while maintaining the cable capacity of 48T and 96T systems. This narrower rack or cabinet solution 26 may also represent a reduced-cost solution. This is illustrated in FIG. 3, providing less space for fabric cables 18 and hand access for upgrades or expansion. Due to the card architecture (as illustrated in FIG. 1), the fabric cables 18 are routed along the sides of the rack or cabinet solution 26, and the client fibers are routed to the fixed rack or cabinet corners. This poses a problem where the client fibers 20 are routed in front of the fabric cables 18. Access to the fabric cables 18 for upgrade or expansion is hindered, and the risk of snagging and damaging client fibers 20 is increased.

FIG. 4 shows a front view comparison of a wider rack or cabinet solution 22 and a narrower rack or cabinet solution 26, showing the individual client fibers 20 crossing from the circuit pack center faceplates 16 to the fixed rack/cabinet corner client trough 28. There is ample room to access the fabric fibers 18 in the wider rack or cabinet solution 22, through the cable cabinets 24, without the risk of damaging the client fibers 20, but not in the narrower rack or cabinet solution 26, in which the fabric fibers 18 must be accessed through the client fibers 20.

The present background is provided as illustrative environmental context only and should not be construed to be limiting in any manner. It will be readily apparent to those of ordinary skill in the art that the principles and concepts of the present disclosure may be implemented in other environmental contexts equally.

BRIEF SUMMARY

The present disclosure provides a rack or cabinet system that utilizes a dynamic (i.e., movable/rotatable) client fiber trough assembly—instead of a typical fixed client fiber trough (or fixed brackets)—allowing the protected bundle of client fibers to be moved/rotated out of the way for access to the fabric cables disposed behind. With the client fiber bundle rotated 90 degrees in front of the rack, for example, the user can access the fabric cables for system upgrade, cable replacement (in the case of a DAC failure, for example), or system expansion. A predetermined amount of fiber slack is provided at the rack fiber ingress area to ensure that the dynamic client fiber trough can move/rotate freely. The dynamic client fiber trough is not limited to use on narrower rack solutions, but can also be implemented on wider cabinet solutions, even with side cable cabinets, to provide even greater access to the fabric cables and circuit pack faceplates. A hinge assembly is provided to move/rotate the dynamic client fiber trough at the front of the cabinet.

In one embodiment, the present disclosure provides a rack/cabinet system, including: a cabinet adapted to receive a circuit pack; a trough assembly movably coupled to the cabinet, where the trough assembly is adapted to receive a plurality of fibers or cables from a faceplate of the circuit pack; and an assembly coupled to the cabinet and adapted to move the trough assembly away from/towards an open portion of the cabinet and the circuit pack. The trough assembly includes a trough body adapted to route the plurality of fibers or cables upwards and/or downwards to a top and/or bottom of the cabinet. The plurality of fibers or cables utilize a degree of slack that is adapted to span a distance between a top and/or bottom portion of the trough body and the top and/or bottom of the cabinet when the trough assembly is moved away from the open portion of the cabinet and the circuit pack. The trough assembly further includes a bend limiter disposed at a top and/or bottom portion of the trough body adapted to limit a degree of bending of the plurality of fibers or cables at the top and/or bottom portion of the trough assembly. The trough assembly further includes a bracket adapted to couple the trough body to the assembly. The trough body defines a plurality of slots adapted to receive the plurality of fibers or cables from the faceplate of the circuit pack. Optionally, the assembly is a hinge assembly and includes a fixed arm coupled to the cabinet and a pivoting arm pivotably coupled to the fixed arm. The hinge assembly further includes a stop feature that limits a degree of pivoting of the pivoting arm relative to the fixed arm. The trough assembly and the assembly are collectively adapted to move the trough assembly away from the open portion of the cabinet and the circuit pack to move the plurality of fibers or cables such that a plurality of blocked fibers or cables coupled to side portions of the circuit pack behind the plurality of fibers or cables can be accessed by a user.

In another embodiment, the present disclosure provides a trough assembly for a rack/cabinet system, the trough assembly including: a trough body adapted to be movably coupled to a cabinet adapted to receive a circuit pack, where the trough body is adapted to receive a plurality of fibers or cables from a faceplate of the circuit pack; and an assembly coupling the trough body to the cabinet and adapted to move the trough body away from/towards an open portion of the cabinet and the circuit pack. The trough body is adapted to route the plurality of fibers or cables upwards and/or downwards to a top and/or bottom of the cabinet. The plurality of fibers or cables utilize a degree of slack that is adapted to span a distance between a top and/or bottom portion of the trough body and the top and/or bottom of the cabinet when the trough body is moved away from the open portion of the cabinet and the circuit pack. The trough assembly further includes a bend limiter disposed at a top and/or bottom portion of the trough body adapted to limit a degree of bending of the plurality of fibers or cables at the top and/or bottom portion of the trough body. The trough assembly further includes a bracket adapted to couple the trough body to the assembly. The trough body defines a plurality of slots adapted to receive the plurality of fibers or cables from the faceplate of the circuit pack. Optionally, the assembly is a hinge assembly and includes a fixed arm adapted to be coupled to the cabinet and a pivoting arm pivotably coupled to the fixed arm. The hinge assembly further includes a stop feature that limits a degree of pivoting of the pivoting arm relative to the fixed arm. The trough body and the assembly are collectively adapted to move the trough body away from the open portion of the cabinet and the circuit pack to move the plurality of fibers or cables such that a plurality of blocked fibers or cables coupled to side portions of the circuit pack behind the plurality of fibers or cables can be accessed by a user.

In a further embodiment, the present disclosure provides a method for providing access to a plurality of blocked fibers or cables in a rack/cabinet system, the method including: providing a cabinet adapted to receive a circuit pack; providing a trough assembly movably coupled to the cabinet, where the trough assembly is adapted to receive a plurality of fibers or cables from a faceplate of the circuit pack; and providing an assembly coupled to the cabinet and adapted to move the trough assembly away from/towards an open portion of the cabinet and the circuit pack. The trough assembly and the assembly are collectively adapted to move the trough assembly away from the open portion of the cabinet and the circuit pack to move the plurality of fibers or cables such that the blocked fibers or cables coupled to side portions of the circuit pack behind the plurality of fibers or cables can be accessed by a user.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which:

FIG. 4 illustrates a side-by-side comparison of the wider rack or cabinet solution of FIG. 2 and the narrower rack or cabinet solution of FIG. 3, with the client fibers bundled in a fixed corner trough for the narrower rack or cabinet solution of FIG. 3;

FIG. 5 illustrates the rack or cabinet system of the present disclosure including the dynamic client fiber trough and hinge assemblies in closed and open configurations, with the fabric cables behind the client fibers being accessible in the open configuration;

FIG. 9 illustrates the construction of the hinge assembly of the present disclosure;

Figure 1:
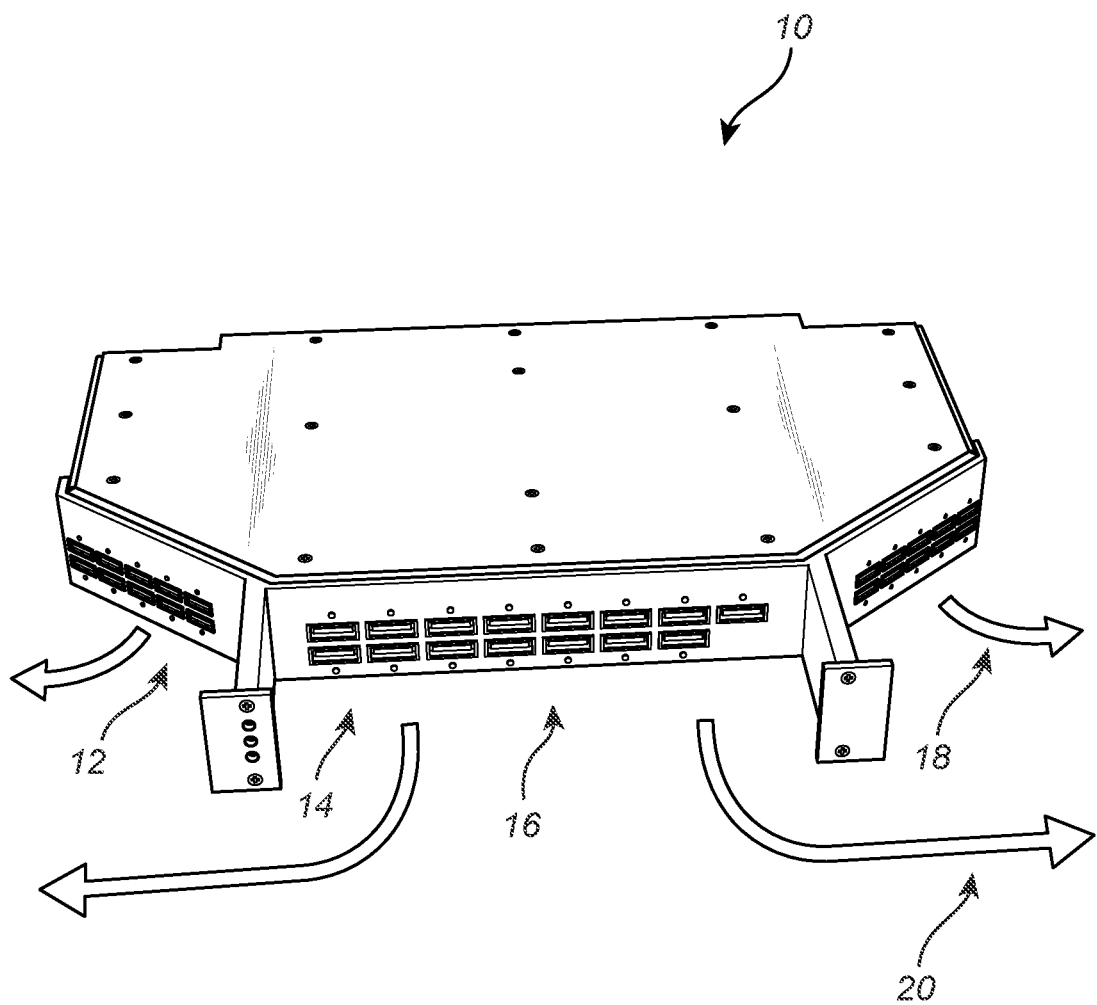
FIG. 1 illustrates a circuit pack with the fabric ports located on the left and right sides of the circuit pack and the client ports located in the center faceplate of the circuit pack.
Figure 2:
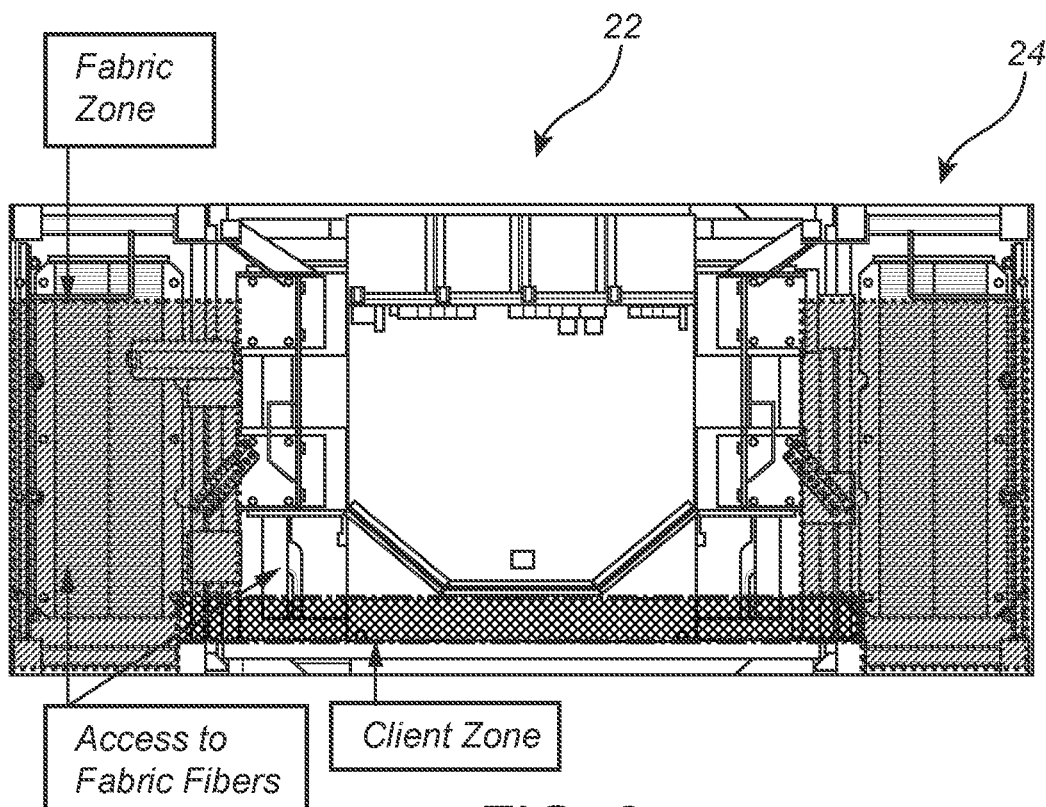
FIG. 2 illustrates a wider rack or cabinet solution with the fabric cables routed through side cable cabinets and the client fibers routed from the center faceplates of the circuit packs, providing substantial access to both the fabric cables and the client fibers.
Figure 3:
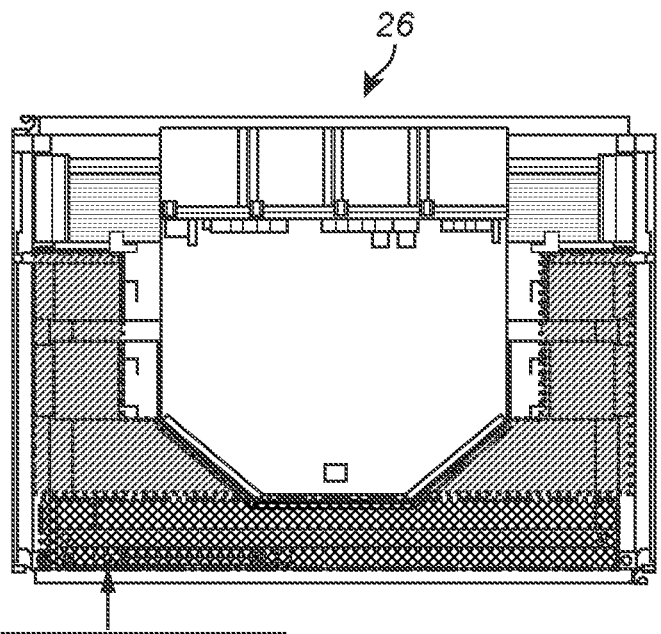
FIG. 3 illustrates a narrower rack or cabinet solution without side cable cabinets and with the fabric cables routed behind the client fibers routed from the center faceplates of the circuit packs, providing limited access to the fabric cables through the client fibers.

It will be readily apparent to those of ordinary skill in the art that aspects and features of each of the illustrated embodiments may be incorporated, omitted, and/or combined as desired in a given application, without limitation.

DETAILED DESCRIPTION

Again, the present disclosure provides a rack or cabinet system that utilizes a dynamic (i.e., movable/rotatable) client fiber trough assembly—instead of a typical fixed client fiber trough (or fixed brackets)—allowing the protected bundle of client fibers to be moved/rotated out of the way for access to the fabric cables disposed behind. With the client fiber bundle rotated 90 degrees in front of the rack, for example, the user can access the fabric cables for system upgrade, cable replacement (in the case of a DAC failure, for example), or system expansion. A predetermined amount of fiber slack is provided at the rack fiber ingress area to ensure that the dynamic client fiber trough can move/rotate freely. The dynamic client fiber trough is not limited to use on narrower rack solutions, but can also be implemented on wider cabinet solutions, even with side cable cabinets, to provide even greater access to the fabric cables and circuit pack faceplates. A hinge assembly is provided to move/rotate the dynamic client fiber trough at the front of the cabinet. Again, "cabinet" and "rack" may be used interchangeably herein, as the dynamic client fiber trough and hinge assemblies of the present disclosure may be coupled to either equally in a system that may or may not be a "shelf system". The rack or cabinet system of the present disclosure is especially applicable in space-constrained applications utilizing a narrow rack or cabinet, without side cable cabinets, and with circuit packs utilizing both faceplate and side/angled fiber/cable ports.

FIG. 5 illustrates the rack or cabinet system 126 of the present disclosure including the dynamic client fiber trough 130 and hinge 140 assemblies in closed and open configurations, with the fabric cables 118 behind the client fibers 120 being accessible in the open configuration. As is illustrated, the rack or cabinet system 126 includes a cabinet 125 that receives a plurality of circuit packs 110 in a stacked configuration. Each of the circuit packs 110 includes a plurality of fabric ports 112 at the front-side portions thereof, and a plurality of client ports 114 at the center faceplate portion 116 thereof. A plurality of fabric cables 118 are coupled to the plurality of fabric ports 112, and a plurality of client fibers 120 are coupled to the plurality of client ports 114. As alluded to above, the plurality of fabric cables 118 are routed to the sides of the cabinet 125, and the plurality of client fibers 120 are routed to a client fiber trough assembly 130, where the client fibers 120 from each circuit pack 110 at each vertical level of the cabinet 125 are bundled and routed upwards, for example, to a top portion of the cabinet 125. In accordance with the present disclosure, the client fiber trough assembly 130 may be moved/rotated outwards and to the side of the cabinet 125 in an open configuration. Thus, in a closed configuration, the client fibers 120 obstruct access to the fabric cables 118 behind the client fibers 120, while in the open configuration, the client fibers 120 are moved/rotated outwards and to the side of the cabinet 125, such that the fabric cables 118 behind the client fibers 120 are readily accessible from the side portions of the front of the cabinet 125. This prevents the client fibers 120 from being manipulated and damaged when the fabric cables 118 are accessed. The client fiber trough assembly 130 rides on a hinge assembly 140, optionally at the top and the bottom of the client fiber trough assembly 130. It should be noted that only a left-side client fiber trough assembly 130 and hinge assemblies 140 are illustrated, although a right-side client fiber trough assembly 130 and hinge assemblies 140 may also be used. Further, each client fiber trough assembly 130 and associated hinge assemblies 140 may serve the entire vertical expanse of the cabinet 125, or subassemblies may be provided for specific vertical sections of the cabinet 125.

Figure 6:
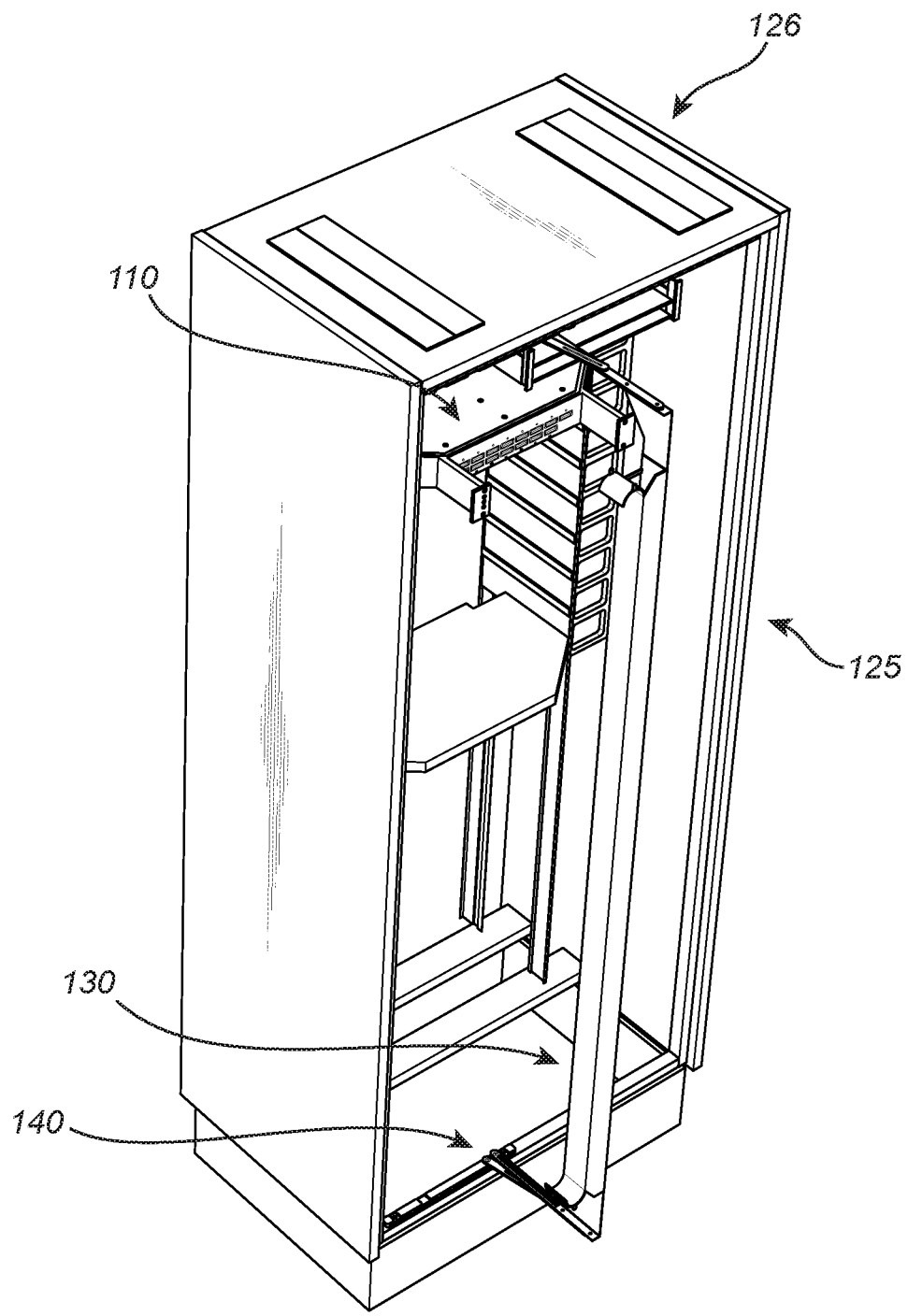
FIG. 6 illustrates the rack or cabinet system of the present disclosure including the dynamic client fiber trough and hinge assemblies in the open configuration, with the fabric cables behind the client fibers being accessible in the open configuration.

FIG. 6 illustrates the rack or cabinet system 126 of the present disclosure including the dynamic client fiber trough 130 and hinge 140 assemblies in the open configuration, with the fabric cables 118 behind the client fibers 120 being accessible in the open configuration. The client fiber trough assembly 130 uses top and bottom hinge assemblies 140 and serves the entire vertical expanse of the cabinet 125. As illustrated, the client fiber trough 130 and hinge 140 assemblies are deployed substantially orthogonal to the front of the cabinet 125, but such orthogonal deployment is not required to provide sufficient deflection of the client fibers 120 and access to the fabric cables 118. In FIG. 6, most of the circuit packs 110, the fabric cables 118, and the client fibers 120 are removed for the sake of clarity.

Figure 7:
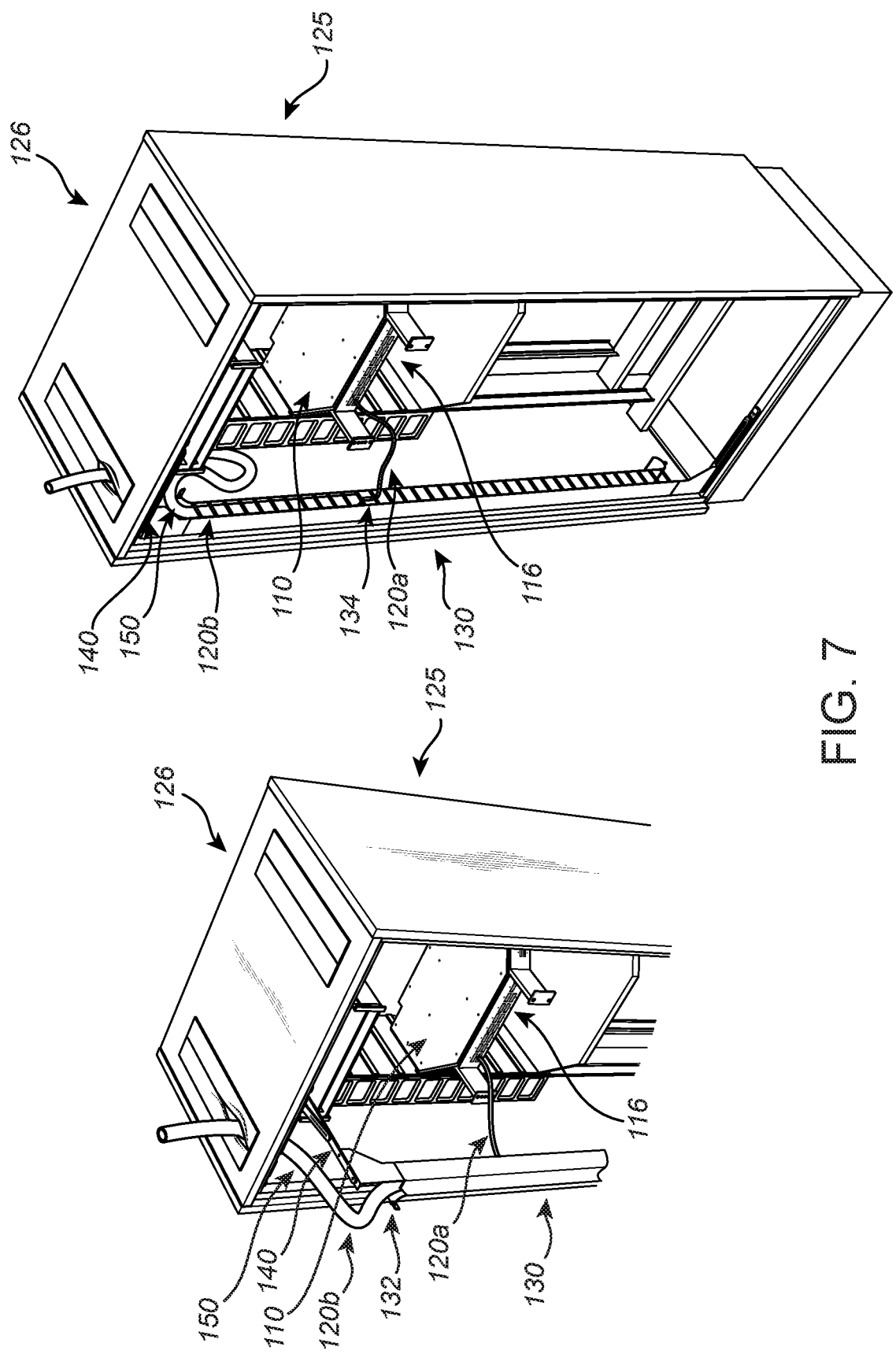
FIG. 7 illustrates the rack or cabinet system of the present disclosure including the dynamic client fiber trough and hinge assemblies in the open and closed configurations, highlighting the client fiber bundle slack provided and the functionality of the bend limiter of the client fiber trough assembly.

FIG. 7 illustrates the rack or cabinet system 126 of the present disclosure including the dynamic client fiber trough 130 and hinge 140 assemblies in the open and closed configurations, highlighting the client fiber bundle slack 150 provided and the functionality of the bend limiter 132 of the client fiber trough assembly 130. Again, in FIG. 7, most of the circuit packs 110 and the fabric cables 118 are removed for the sake of clarity. The client fibers 120 include client fibers 120a that are routed from the faceplates 116 of the circuit packs 110 to the client fiber trough assembly 130 at each level, being routed through corresponding slots 134 in the client fiber trough assembly 130. Within the client fiber trough assembly 130, the client fibers 120a are collected into a client fiber bundle 120b and routed upwards in the client fiber trough assembly 130, around the bend limiter 132, and through the top of the cabinet 125. The client fiber bundle slack 150 is provided to span the distance between the cabinet 125 and the deployed client fiber trough assembly 130 in the open configuration. In the closed configuration, the client fiber bundle slack 150 is collected within the cabinet 125 in a serpentine or coiled manner. The operation of the bend limiter 132 and the client fiber bundle slack 150 ensure that unwanted kinking of the client fibers 120 does not occur, while allowing the client fiber trough 130 and hinge 140 assemblies to be deployed and retracted without unwanted resistance.

Figure 8:
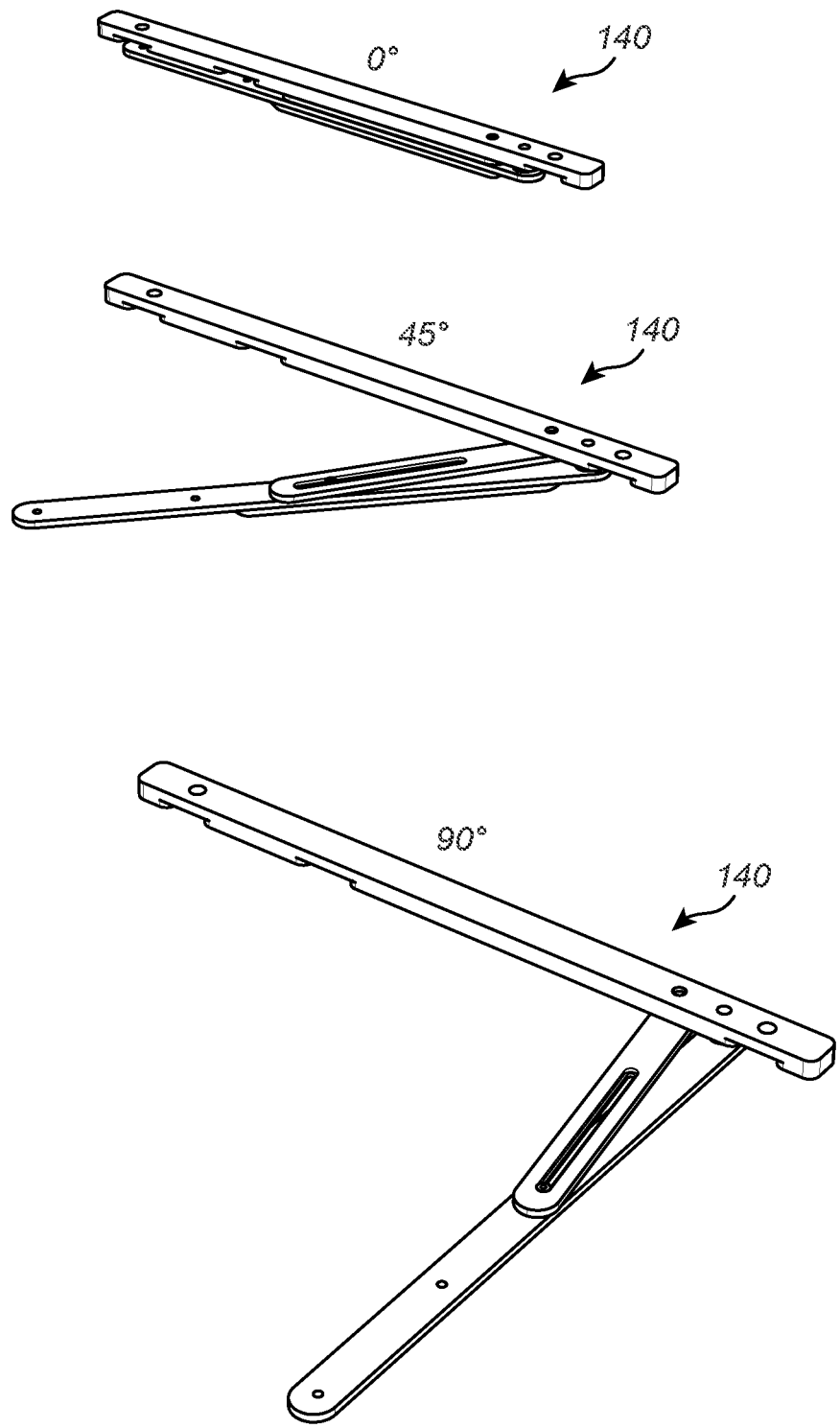
FIG. 8 illustrates the hinge assembly of the present disclosure in various closed and open configurations.

FIG. 8 illustrates the hinge assembly 140 of the present disclosure in various closed and open configurations. 0-degree, 45-degree, and 90-degree deployments are illustrated by way of example, and detents may be provided in the various degrees of deployment and the hinge assembly may utilize a stop feature that limits deployment to a desired degree. Alternatively, a degree of friction may be provided such that the hinge assembly 140 stays open in any degree of deployment, with a predetermined force serving to open and close the hinge assembly 140. Alternatively, a locking screw may be provided such that the hinge assembly 140 stays open in any degree of deployment via actuation (e.g., tightening) of the locking screw, with a predetermined force serving to open and close the hinge assembly 140 after actuation (e.g., loosening) of the locking screw. Again, the hinge 140 assembly may be deployed substantially orthogonal when in the fully-open configuration, but such orthogonal deployment is not required to provide sufficient deflection of the client fibers 120 and access to the fabric cables 118. A hard stop may be provided at 90 degrees of deployment to protect the integrity of the client fibers 120.

FIG. 9 illustrates the construction of the hinge assembly 140 of the present disclosure. The hinge assembly 140 includes a fixed arm 141 that is adapted to be coupled to the cabinet 125 and a pivoting arm 142 that is adapted to be pivotably deployed from the fixed arm 141. A spanning arm 143 is coupled between the fixed arm 141 and the pivoting arm 142, pivoting with respect to the fixed arm 141 and having a slotted, translating connection to the pivoting arm 142, such that the fixed arm 141, the pivoting arm 142, and the spanning arm 143 form a pivotable, expandable scissor mechanism. Any arrangement of screws or bolts 145 and/or pegs 146 may be used to couple the fixed arm 141, the pivoting arm 142, and the spanning arm 143. A stiffener rib 147 may be provided on a surface of the pivoting arm 142 to provide the pivoting arm 142 with sufficient rigidity to support the client fiber trough assembly 130. It will be readily apparent to those of ordinary skill in the art that other types of hinge assemblies may be used equally, provided that a pivoting arm equivalent functionality is provided.

Figure 10:
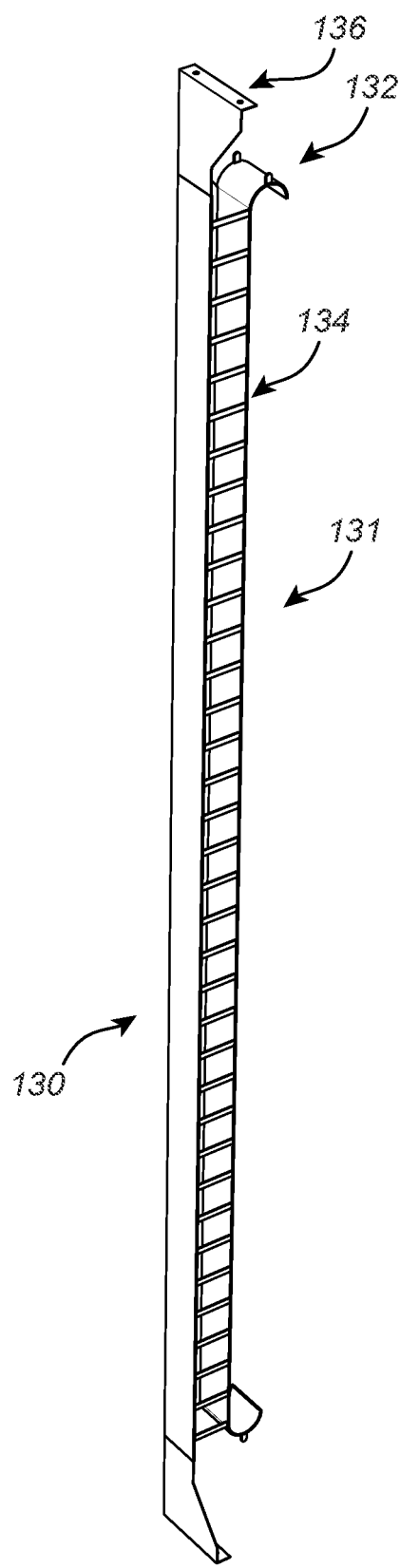
FIG. 10 illustrates the client fiber trough assembly of the present disclosure.

FIG. 10 illustrates the client fiber trough assembly 130 of the present disclosure. The client fiber trough assembly 130 includes substantially hollow trough body 131 that is adapted to contain the client fiber bundle 120b. The trough body 131 defines the plurality of vertically-arranged slots 134 through which the client fibers 120a are routed from the faceplates 116 of the circuit packs 110. A bracket 136 is provided at each end of the trough body 131 for coupling the trough body 131 to the pivoting arm 142 of each hinge assembly 140. Finally, a bend limiter 132 is provided at either or both ends of the trough body 131. Again, the bend limiter(s) 132 prevent severe bends to the client fiber bundle 120b. In practice, the client fiber bundle(s) 120b may be routed upwards and/or downwards in the trough body 131, with the client fiber bundle(s) 120b being routed out of top and/or bottom of the cabinet 125. Each bend limiter 132 consists of a simple arc structure or the like that controls and limits the bend radius of the client fiber bundle 120b. It should be noted that all components of the client fiber trough 130 and hinge 140 assemblies may be manufactured from any suitable rigid metallic and/or plastic material(s).

Figure 11:
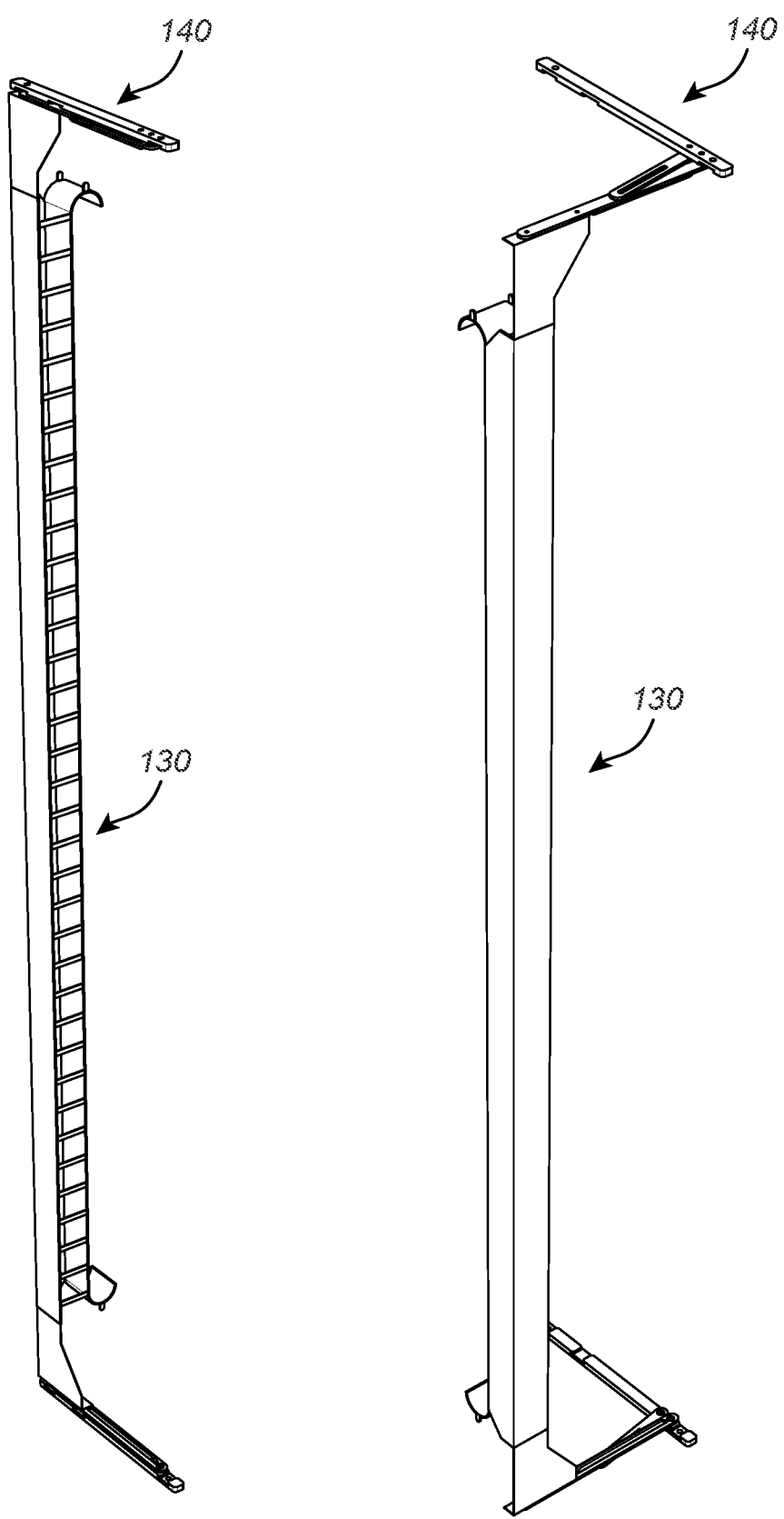
FIG. 11 illustrates the client fiber trough and hinge assemblies of the present disclosure in closed and open configurations.

FIG. 11 illustrates the client fiber trough 130 and hinge 140 assemblies of the present disclosure in closed and open configurations. Again, as illustrated, the client fiber trough 130 and hinge 140 assemblies may be deployed substantially orthogonal to the front of the cabinet 125, but such orthogonal deployment is not required to provide sufficient deflection of the client fibers 120 and access to the fabric cables 118.

Thus, again, the present disclosure provides a rack or cabinet system that utilizes a dynamic (i.e., movable/rotatable) client fiber trough assembly—instead of a typical fixed client fiber trough (or fixed brackets)—allowing the protected bundle of client fibers to be moved/rotated out of the way for access to the fabric cables disposed behind. With the client fiber bundle rotated 90 degrees in front of the rack, for example, the user can access the fabric cables for system upgrade, cable replacement (in the case of a DAC failure, for example), or system expansion. A predetermined amount of fiber slack is provided at the rack fiber ingress area to ensure that the dynamic client fiber trough can move/rotate freely. The dynamic client fiber trough is not limited to use on narrower rack solutions, but can also be implemented on wider cabinet solutions, even with side cable cabinets, to provide even greater access to the fabric cables and circuit pack faceplates. A hinge assembly is provided to move/rotate the dynamic client fiber trough at the front of the cabinet.

The dynamic client fiber trough and hinge assemblies of the present disclosure provide full access to the fabric cables at the faceplates of the circuit packs, full access to the fabric cables alongside of the rack or cabinet system, and provide fiber bend radius protection at either end of the client fiber trough to ensure that the client fiber bundle does not get damaged in static or dynamic positions. Thus, the damage risk to client fibers is mitigated, as the user no longer needs to reach between bundles of faceplate client fiber with hands, tools, etc. This provides the same level of fiber protection as a static trough designs in both dynamic and static positions. The dynamic trough can be fastened into the closed configuration for security. The parts and assemblies are symmetrical—meaning that the same basic parts can be used on the left side and right side of the rack. This increases part volume, lowering cost. The fiber trough 'face' (i.e., where the fiber enters the trough) continuously points towards the circuit packs during rotation. The fiber length between the faceplate and the trough (in both open and closed positions) is very consistent (within ~5 mm) and does not cause stresses to the fiber during movement. The assemblies of the present disclosure can be adapted to various rack styles and sizes. Circuit packs can be removed/replaced as per normal operations when the dynamic fiber trough is in the closed configuration. The rack footprint is maintained during standard system operation, when access to fabric fibers is required, the rack front door can be closed, ensuring compliance with all relevant specifications and standards. This ensures a clean 'maintenance aisle'—rack items not protruding into the maintenance aisle.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A rack/cabinet system, comprising:
   a cabinet adapted to receive a circuit pack;
   a trough assembly movably coupled to the cabinet, wherein the trough assembly is adapted to receive a plurality of fibers or cables from a faceplate of the circuit pack; and
   an assembly coupled to the cabinet and adapted to move the trough assembly away from/towards an open portion of the cabinet and the circuit pack;
   wherein the trough assembly is movable or rotatable from a position corresponding to an internal portion of the circuit pack in an open configuration exposing fibers or cables coupled to a side portion of the circuit pack to another position corresponding to the side portion of the circuit pack in a closed configuration in which an associated side of the cabinet blocks the fibers or cables coupled to the side portion of the circuit pack.

2. The system of claim 1, wherein the trough assembly comprises a trough body adapted to route the plurality of fibers or cables upwards and/or downwards to a top and/or bottom of the cabinet.

3. The system of claim 2, wherein the plurality of fibers or cables utilize a degree of slack that is adapted to span a distance between a top and/or bottom portion of the trough body and the top and/or bottom of the cabinet when the trough assembly is moved away from the open portion of the cabinet and the circuit pack.

4. The system of claim 2, wherein the trough assembly further comprises a bend limiter disposed at a top and/or bottom portion of the trough body adapted to limit a degree of bending of the plurality of fibers or cables at the top and/or bottom portion of the trough assembly.

5. The system of claim 2, wherein the trough assembly further comprises a bracket adapted to couple the trough body to the assembly.

6. The system of claim 2, wherein the trough body defines a plurality of slots adapted to receive the plurality of fibers or cables from the faceplate of the circuit pack.

7. The system of claim 1, wherein the assembly is a hinge assembly and comprises a fixed arm coupled to the cabinet and a pivoting arm pivotably coupled to the fixed arm.

8. The system of claim 7, wherein the hinge assembly further comprises a stop feature that limits a degree of pivoting of the pivoting arm relative to the fixed arm.

9. The system of claim 1, wherein, in the open configuration, the trough assembly is away from the open portion of the cabinet and the circuit pack, and is pivoted to the associated side of the cabinet and the open portion of the cabinet and the circuit pack in the closed configuration.

10. A trough assembly for a rack/cabinet system, the trough assembly comprising:
a trough body adapted to be movably coupled to a cabinet adapted to receive a circuit pack, wherein the trough body is adapted to receive a plurality of fibers or cables from a faceplate of the circuit pack; and
an assembly coupling the trough body to the cabinet and adapted to move the trough body away from/towards an open portion of the cabinet and the circuit pack;
wherein the trough assembly is movable or rotatable from a position corresponding to an internal portion of the circuit pack in an open configuration exposing fibers or cables coupled to a side portion of the circuit pack to another position corresponding to the side portion of the circuit pack in a closed configuration in which an associated side of the cabinet blocks the fibers or cables coupled to the side portion of the circuit pack.

11. The trough assembly of claim 10, wherein the trough body is adapted to route the plurality of fibers or cables upwards and/or downwards to a top and/or bottom of the cabinet.

12. The trough assembly of claim 11, wherein the plurality of fibers or cables utilize a degree of slack that is adapted to span a distance between a top and/or bottom portion of the trough body and the top and/or bottom of the cabinet when the trough body is moved away from the open portion of the cabinet and the circuit pack.

13. The trough assembly of claim 11, wherein the trough assembly further comprises a bend limiter disposed at a top and/or bottom portion of the trough body adapted to limit a degree of bending of the plurality of fibers or cables at the top and/or bottom portion of the trough body.

14. The trough assembly of claim 11, wherein the trough assembly further comprises a bracket adapted to couple the trough body to the assembly.

15. The trough assembly of claim 11, wherein the trough body defines a plurality of slots adapted to receive the plurality of fibers or cables from the faceplate of the circuit pack.

16. The trough assembly of claim 10, wherein the assembly is a hinge assembly and comprises a fixed arm adapted to be coupled to the cabinet and a pivoting arm pivotably coupled to the fixed arm.

17. The trough assembly of claim 16, wherein the hinge assembly further comprises a stop feature that limits a degree of pivoting of the pivoting arm relative to the fixed arm.

18. The trough assembly of claim 10, wherein, in the open configuration, the trough body is away from the open portion of the cabinet and the circuit pack, and is pivoted to the associated side of the cabinet and the open portion of the cabinet and the circuit pack in the closed configuration.

19. A method for providing access to a plurality of blocked fibers or cables in a rack/cabinet system, the method comprising:
providing a cabinet adapted to receive a circuit pack;
providing a trough assembly movably coupled to the cabinet, wherein the trough assembly is adapted to receive a plurality of fibers or cables from a faceplate of the circuit pack; and
providing an assembly coupled to the cabinet and adapted to move the trough assembly away from/towards an open portion of the cabinet and the circuit pack;
wherein the trough assembly is movable or rotatable from a position corresponding to an internal portion of the circuit pack in an open configuration exposing fibers or cables coupled to a side portion of the circuit pack to another position corresponding to the side portion of the circuit pack in a closed configuration in which an associated side of the cabinet blocks the fibers or cables coupled to the side portion of the circuit pack.

20. The method of claim 19, wherein, in the open configuration, the trough assembly is away from the open portion of the cabinet and the circuit pack, and is pivoted to the associated side of the cabinet and the open portion of the cabinet and the circuit pack in the closed configuration.

* * * * *